(12) United States Patent
Langseder

(10) Patent No.: US 8,864,001 B2
(45) Date of Patent: Oct. 21, 2014

(54) ADAPTABLE SUPPORT ARRANGEMENT FOR A PICKUP TRUCK

(76) Inventor: Jay Langseder, Santa Ana, CA (US)

( * ) Notice: Subject to any disclaimer, the term of this patent is extended or adjusted under 35 U.S.C. 154(b) by 318 days.

(21) Appl. No.: 13/506,767

(22) Filed: May 16, 2012

(65) Prior Publication Data

US 2013/0306694 A1 Nov. 21, 2013

(51) Int. Cl.
*B60P 3/40* (2006.01)
*B60R 9/042* (2006.01)
*B60R 9/045* (2006.01)

(52) U.S. Cl.
CPC . *B60P 3/40* (2013.01); *B60R 9/042* (2013.01); *B60R 9/045* (2013.01)
USPC .............................. 224/405; 296/3; 296/26.09

(58) Field of Classification Search
USPC .......... 224/402, 403, 405; 296/3, 37.6, 26.09; D12/406, 414, 414.1
See application file for complete search history.

(56) References Cited

U.S. PATENT DOCUMENTS

| | | | | |
|---|---|---|---|---|
| 2,712,470 A | * | 7/1955 | Cardini | 296/26.09 |
| 2,720,414 A | * | 10/1955 | Hart | 296/12 |
| 2,729,499 A | * | 1/1956 | Eggum | 296/26.09 |
| 3,712,524 A | * | 1/1973 | Ames, Sr. | 224/310 |
| D253,170 S | * | 10/1979 | Ramirez | D12/412 |
| 4,770,458 A | * | 9/1988 | Burke et al. | 296/3 |
| 4,951,991 A | * | 8/1990 | Haigler | 296/26.09 |
| 5,143,415 A | * | 9/1992 | Boudah | 296/3 |
| 5,190,337 A | * | 3/1993 | McDaniel | 296/3 |
| 5,316,190 A | * | 5/1994 | Bullock | 224/405 |
| 5,480,205 A | * | 1/1996 | Tayar | 296/3 |
| D367,843 S | * | 3/1996 | Tayar | D12/412 |
| 5,904,463 A | * | 5/1999 | Christensen | 414/462 |
| 6,186,571 B1 | * | 2/2001 | Burke | 296/3 |
| 6,598,922 B2 | * | 7/2003 | Morse et al. | 296/26.02 |
| 6,983,968 B2 | * | 1/2006 | Brauer et al. | 296/3 |
| 8,191,952 B2 | * | 6/2012 | Mokhtari et al. | 296/3 |
| 8,328,263 B1 | * | 12/2012 | Alexander et al. | 296/26.09 |
| 2002/0167186 A1 | | 11/2002 | Morse et al. | |
| 2004/0026945 A1 | * | 2/2004 | Kench et al. | 296/3 |
| 2007/0034655 A1 | * | 2/2007 | Storer | 224/403 |
| 2009/0166390 A1 | * | 7/2009 | Flaherty | 224/405 |
| 2011/0024472 A1 | * | 2/2011 | Thompson et al. | 224/500 |

* cited by examiner

*Primary Examiner* — Justin Larson
(74) *Attorney, Agent, or Firm* — Don Halgren

(57) ABSTRACT

A variable load support system for enhancing the load carrying capabilities of a bed of any one of a variety of variously sized pickup trucks, the support system comprising a first pair of elongated, longitudinally-extendable pickup truck sidewall engageable side rails, a forwardly arranged first and a rearwardly arranged second, elongated, longitudinally-extendable pickup-truck-bed-traversing transverse rails, and a roller member housingly arranged about the rearwardly arranged pickup truck bed traversing transverse rail so as to permit the widthwise adaptability of the second transverse rail to a pickup truck side wall.

11 Claims, 15 Drawing Sheets

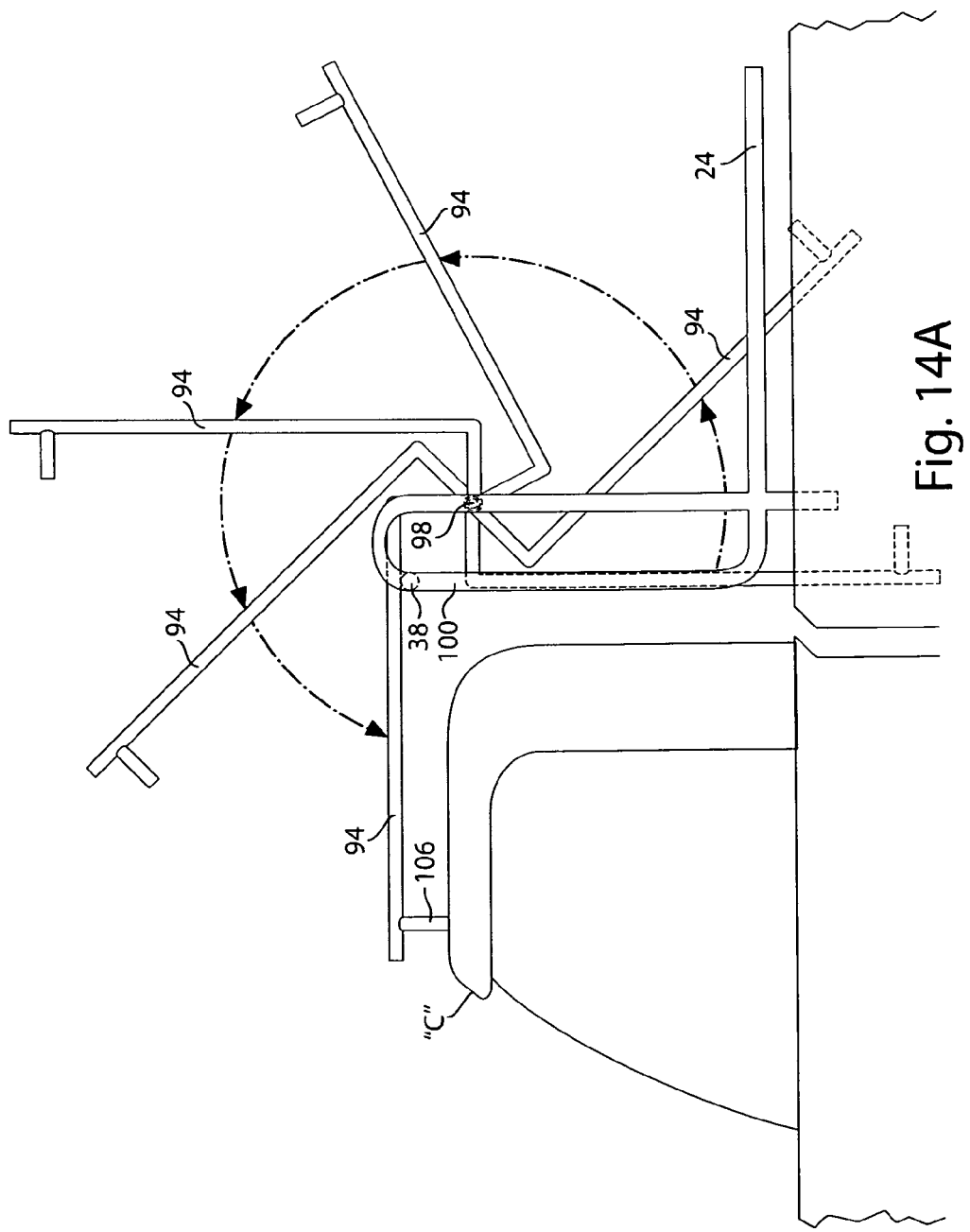

ADAPTABLE SUPPORT ARRANGEMENT FOR A PICKUP TRUCK

BACKGROUND OF THE INVENTION

1. Field of the Invention

This invention relates to pickup trucks and more particularly to adjustable frame arrangements for supporting a variety of different loads in the pickup truck bed.

2. Prior Art

Almost one in four of every vehicles on the road in the United States today is a pickup truck. These vehicles are utilized often, as both a family vehicle and a utilitarian vehicle. It is the nature of these truck owners to make them as functional as possible for a wide variety of capacities. These pickup trucks are offered in a wide range of cab sizes, bed widths and bed lengths. A basic frame arrangement for assisting in pickup truck load carrying capacity and capability is needed which can easily accommodate the various width and length sizes a pickup truck enthusiast is likely to encounter and buy/lease.

One such a bed arrangement for improving pickup truck functionality is shown in Morse et al U.S. patent application 2002/016718 6A1. That bed arrangement shows an extendable rack for a pickup truck. However, that bed arrangement lacks certain "rollability" convenience features as well as a combined adaptability towards different width truck bodies.

It is an object of the present invention to overcome the disadvantages of the prior art.

It is a further object of the present invention to provide an adaptable pickup truck rack arrangement which has the necessary strength for appropriate support of various loads.

It is a further object of the present invention to provide an adaptable pickup truck rack arrangement which has the necessary size adaptability for different size pickup truck beds to which such rack arrangement may be applied.

It is a further object of the present invention to provide an adaptable pickup truck rack arrangement with certain aspects thereof which will combine size adaptability, ease of cargo receivability, safety and sport design.

BRIEF SUMMARY OF THE INVENTION

The present invention comprises an adaptable load support arrangement for pickup trucks. The adaptable load support arrangement comprises a pair of parallel, length-adjustable side rail assemblies which are respectively secured to the upper shelves or shoulders of a pickup truck sidewall by a plurality of spaced-apart sidewall side rail stanchions which fixedly mate with openings in the upper shelve on each respective side of the pickup truck bed.

Each side rail assembly has a vertical front rail attached thereto, in an "L" shaped configuration, as part of a front assembly. Each front rail is joined to a widthwise adjustable upper transverse front rail and then adjustable lower transverse front rail.

Each side rail assembly has a rear portion in which an adjustable rear support bar is adjustably arranged. The adjustable rear sports bar includes a similarly shaped rear roller rotatably arranged around the rear support bar. The rear support bar is transversely extendable within the rear roller. Each side rail assembly has a relatively often enter meeting telescope be extendable side rail members there with them. The rearmost of the narrowest telescoping member mates with the rear support bar, to permit it to extend over the rear end of the bed of the truck and over and beyond a horizontally disposed tailgate thereof.

The rear distalmost end of the narrowest telescoping member of the side rail assembly is arranged at an obtuse angle with respect to its longitudinal axis. The adjustable rear support bar is of U-shaped configuration having leg portions which made with an opening within that obtusely angled distalmost portion of the innermost side rail.

A second load support arrangement, to enable a second level support array, is comprised of a plurality of transverse, telescopingly adjustable connecting members attached to spaced-apart locations between the adjustable side rail assemblies. Each of the spaced-part transverse connecting members provides the basis for a separate load bearing support member base from that of the lower bed of the pickup truck.

A third load support arrangement, to enable a third level support array to be maintained on the pickup truck, is comprised of a plurality of longitudinally extending telescopingly and the adjustable side rails, and arranged between the upper transverse front rail and the shoulder portions of the adjustable rear support bar. The third load support arrangement permits yet a further separate and distinct platform for separating cargo loads and for providing control and reinforcement for the adjustable rear support bar extending beyond the rear bed of the pickup truck.

A yet another load support platform in a further embodiment of the present invention comprises an articulable roof rack arranged on the front assembly of the pickup truck adaptable load assembly, which also functions as a window guard, when in its rearward orientation. The roof rack comprises a plurality of "L" shaped platform members which are attached to a horizontally disposed pivot bar for swingable movement about a pair of inwardly extending side axes which axes extend inwardly from a pair of spaced apart "U" shaped reinforcing frames of that front assembly. The L-shaped platform members are attached at their distalmost end to a transversely disposed "lower-to-front" platform bar. The platform members are movable from a vertical configuration immediately behind the cab of a pickup truck in a 270° rotation about its pivot axis, to a horizontal configuration immediately above the cab of the pickup truck. The roof rack may be stabilized by legs extending onto the roof of the cab. The pivot bar may be transversely adjustable to accommodate different sized pickup trucks in a manner similar to the transverse and longitudinal size accommodations of the other support members of this invention.

The invention thus comprises a variable load support system for enhancing the load carrying capabilities of a bed of any one of a variety of variously sized pickup trucks, the support system comprising: a first pair of elongated, longitudinally-extendable pickup truck sidewall engageable side rails; a forwardly arranged first and a rearwardly arranged second, elongated, longitudinally-extendable pickup-truck-bed-traversing transverse rails; and a roller member housingly arranged about the rearwardly arranged pickup truck bed traversing transverse rail so as to permit the widthwise adaptability of the second transverse rail to a pickup truck side wall. The first transverse rail comprises an internal, telescoping-permitting expanding inner rail supportively enclosed by a pair of outer rails, to permit the forward portion of the support system to adapt to the width of the front of any of a wide variety of pickup truck beds. The side rails have a plurality of spaced apart pickup truck side wall engaging stanchions, to provide structural support of the side rails to the sidewalls of a pickup truck. The system includes a second pair of elongated side rails, arranged at an acute angle with respect to the first pair of side rails. The second pair of side rails are attached between the forwardly arranged transverse rail and the rearwardly arranged transverse rail. The first pair of side rails and the second pair of side rails are correspondingly longitudinally extendable. The forward transverse rail has an articulable truck window protection grate pivotably attached thereto. The articulable truck window protection grate comprises a roof rack in a forwardly pivoted orientation. The roof rack is of "L" shape in lontgitudinal cross-section. The rearwardly arranged transverse rail is arranged at an obtuse angle with respect to the longitudinal extending axis of movement of the siderails. The first pair of side rails have a plurality of transversely arranged longitudinally extensible connecting members supportively extending therebetween. The roof rack comprises a plurality of "L" shaped platform members which are connected between a pivot axis and a lower front platform bar on a front assembly. The roof rack of the front assembly rests upon an arrangement of feet when the roof rack is pivoted forwardly over a pickup truck cab. The second pair of side rails comprises a second load supporting frame.

The invention also comprises a method of enhancing the cargo carrying capacity of any one of a wide variety of different sized pickup trucks comprising: arranging a side rail assembly consisting of first pair of elongated, telescopingly adjustable, side wall engageable side rails and a front assembly, onto side walls of a pickup truck, wherein the front assembly comprises a forwardly arranged elongated, telescopingly adjustable transversely extending transverse rail between a forward end of the first pair of side rails; arranging a rearwardly, second, elongated, longitudinally-extendable pickup-truck-bed-traversing transverse rail; enclosing a roller member housingly about the rearwardly arranged pickup truck bed traversing transverse rail so as to permit the widthwise adaptability of the second transverse rail to a pickup truck side wall; pivotably attaching a roof rack onto the front assembly to permit the roof rack to be pivoted from a rearward vertical orientation to a forwardly oriented rack over a cab of a pickup truck utilizing the side rail assembly; and pivotably the roof rack of the front assembly to permit the roof rack to be pivoted to a rearward cab window protecting vertical orientation from a forwardly oriented rack over a cab of a pickup truck utilizing the side rail assembly.

BRIEF DESCRIPTION OF THE DRAWINGS

The objects and advantages of the present invention will become more apparent, when viewed in conjunction with the following drawings, in which:

FIG. 14A shows a side view of the roof rack of FIG. 14, showing stages of rotation about its axis of rotation;

DETAILED DESCRIPTION OF THE PREFERRED EMBODIMENTS

Figure 1:
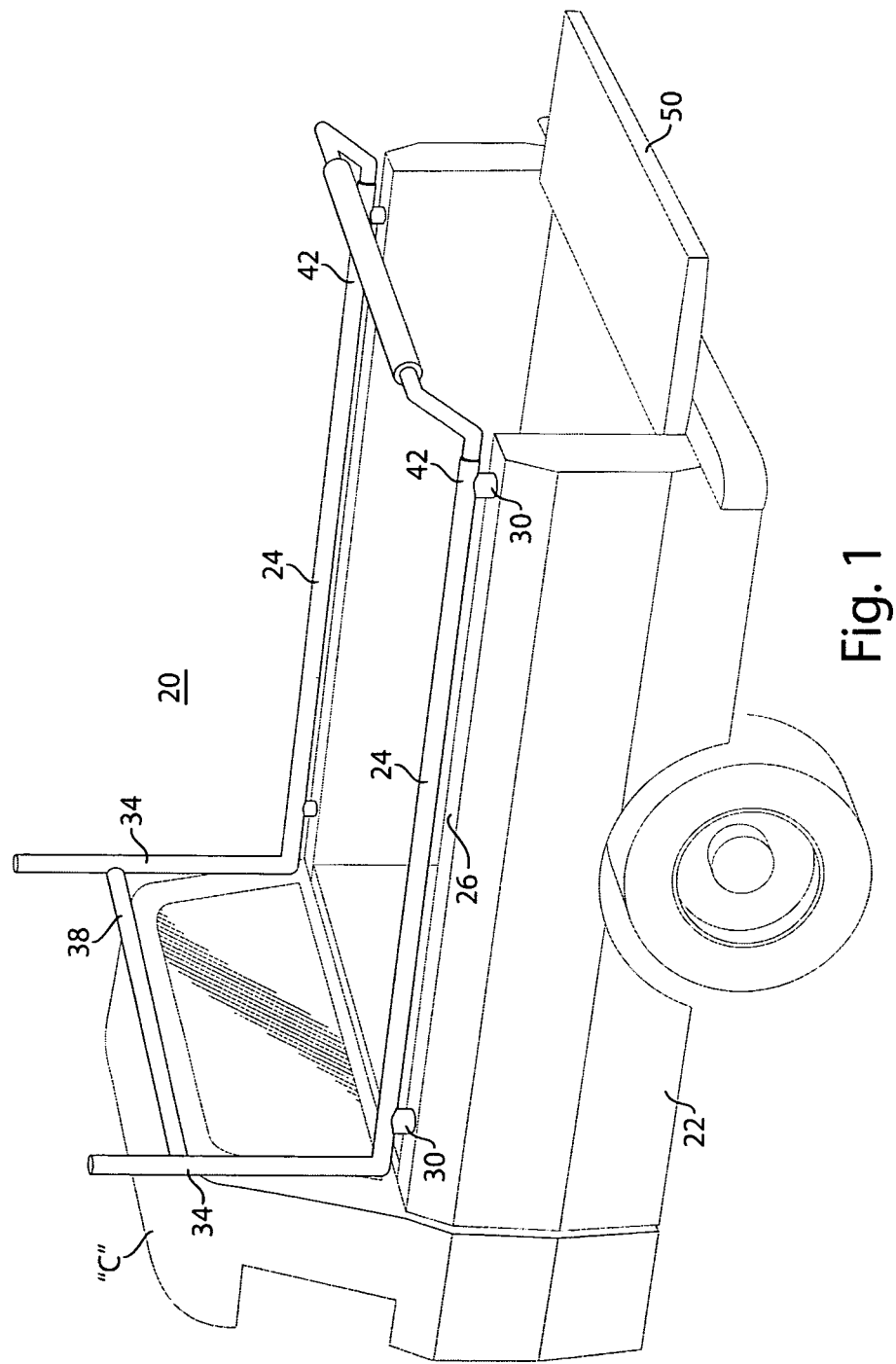
FIG. 1 is a rear perspective view of a pickup truck showing an adaptable support arrangement disposed over the bed of that pickup truck.
Figure 2:
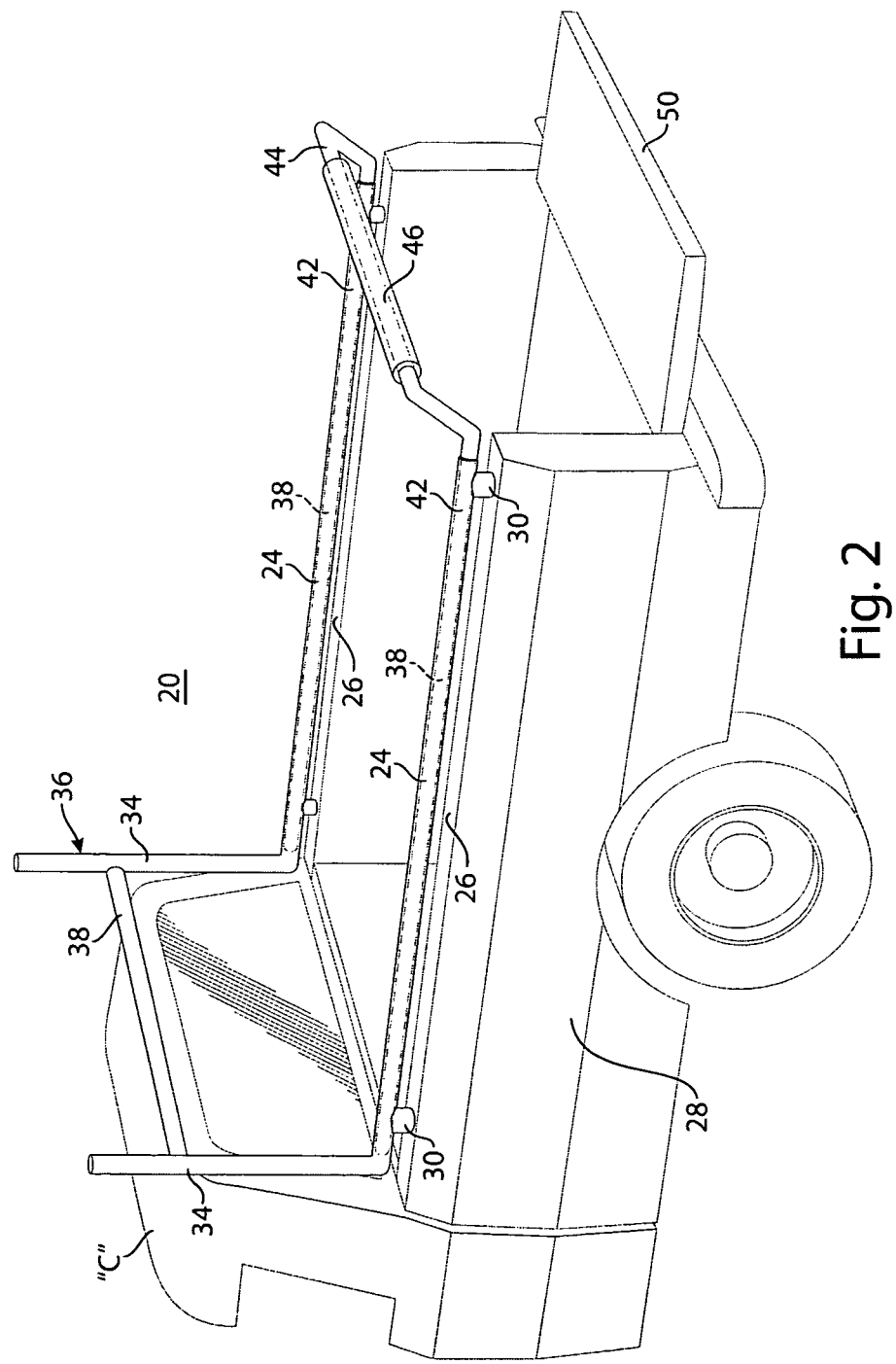
FIG. 2 is a view similar to FIG. 1, showing the intermating relationship of side rail members and a rear support bar.
Figure 3:
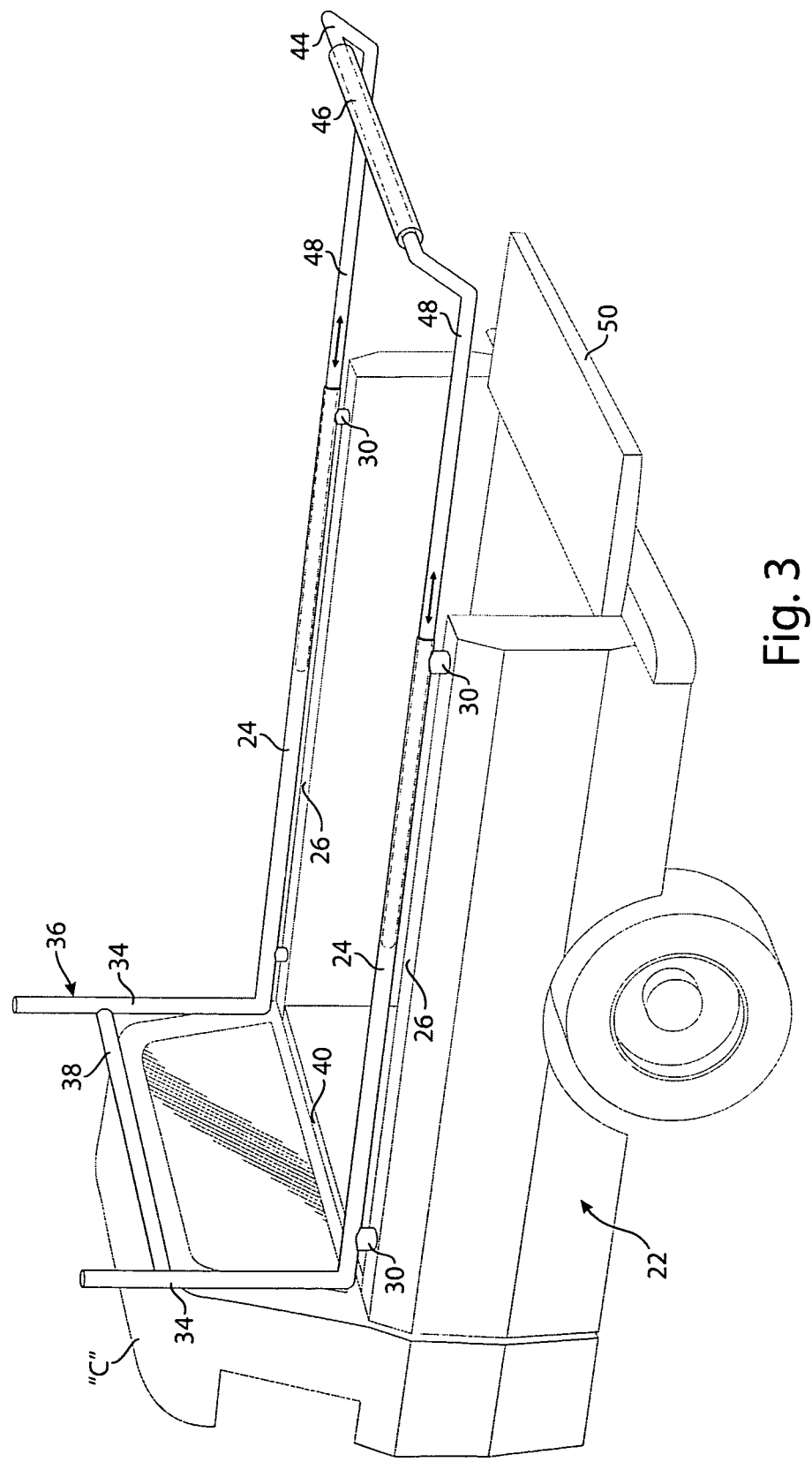
FIG. 3 is a view similar to FIG. 2 showing the side rail members in an extended orientation.

Referring now to the drawings in detail, and to FIG. 1 in particular, there is shown the present invention which comprises an adaptable load support arrangement 20 for pickup trucks 22. The adaptable load support arrangement 20 comprises a pair of parallel, length-adjustable side rail assemblies 24 which are respectively secured to the upper shelves 26 of a pickup truck sidewall 28 by a plurality of spaced-apart sidewall side rail stanchions 30 which fixedly mate with openings 32 in the upper shelf 26 on each respective side 28 of the bed of the pickup truck 22, as shown in FIGS. 1,2 and 3.

Figure 12:
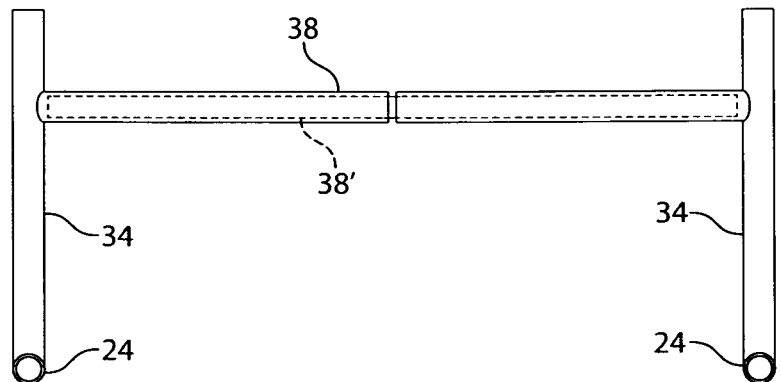
FIG. 12 is a side elevational view of the upper transverse front rail.
Figure 13:
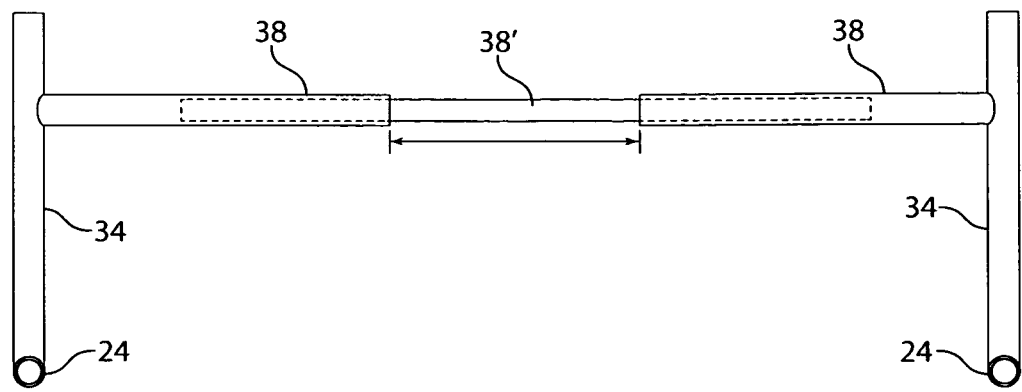
FIG. 13 is a view similar to FIG. 12, showing the adjustability of the transverse rail.

Each side rail assembly 24 has a vertical front rail 34 attached thereto, in an "L" shaped configuration, as part of a front assembly 36. Each front rail 34 is joined to a widthwise adjustable upper transverse split, hollow, front rail 38, with an enclosed, rigid, widthwise, telescoping expansion permitting internal rail 38', as shown in FIGS. 1 and 2, and more particularly in FIGS. 12 and 13.

Figure 6:
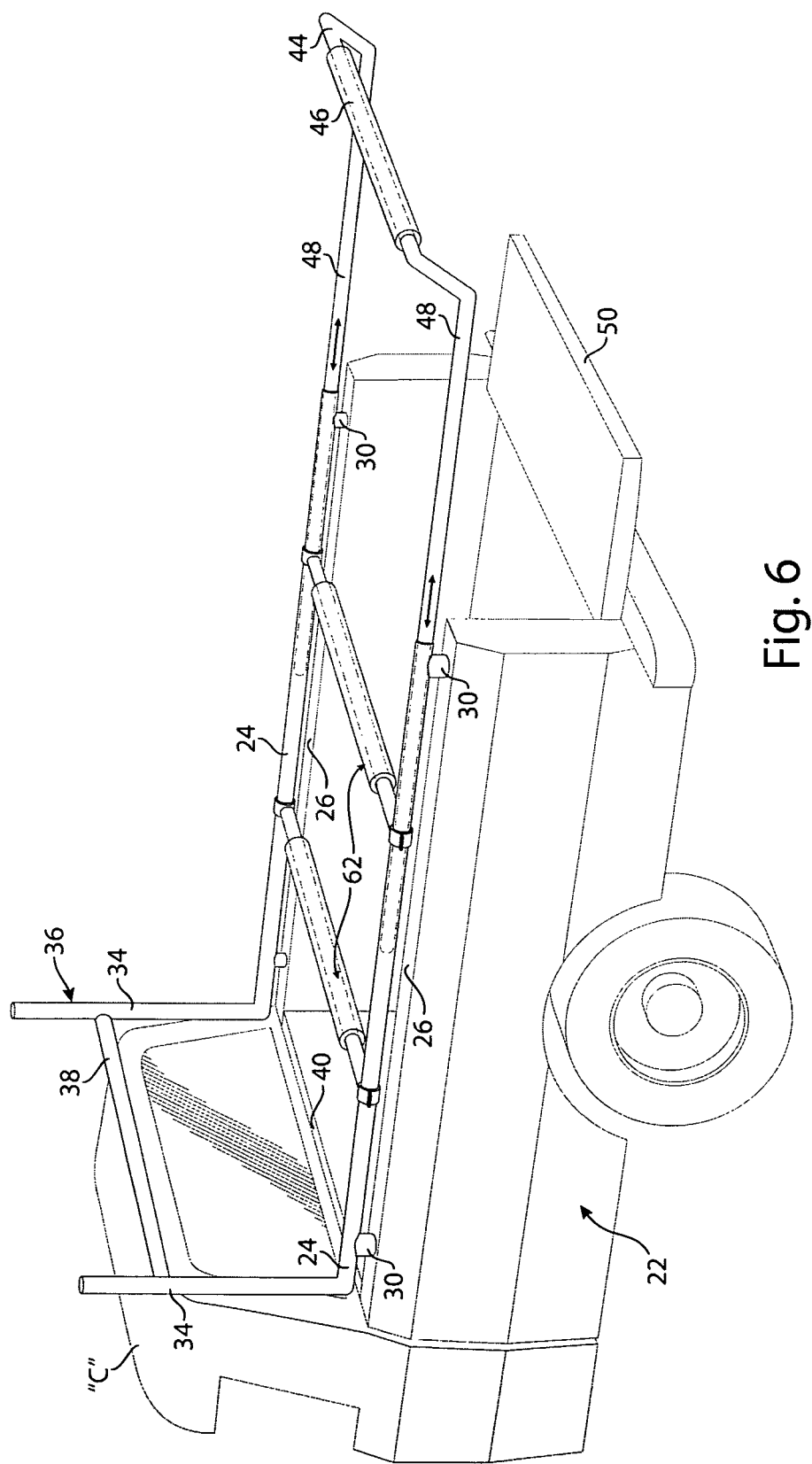
FIG. 6 is a rear perspective view of the side rails extended and the transverse bar members therewith.

Each side rail assembly 24 has a rear portion 42 in which a split-wise (width) adjustable rear support bar 44 is adjustably arranged to accommodate differing widths of a pickup truck 22. The adjustable rear support bar 44 includes a similarly shaped outer rear roller 46 rotatably arranged around the extendable rear support bar 44, keeping it in alignment and securely (rotatably) supported. The split rear support bar 44 is transversely extendable within the rear roller 46. Each rear portion 42 of each side rail assembly 24 has an inner, narrower, mating first tubular member 48 telescopingly extendable therethrough, a forward portion being shown in dashed lines, the telescoping relationship being best represented in FIG. 3. The rearmost portion of the narrowest first telescoping member 48 mates with the rear support bar 44, as represented in FIG. 2A, to permit it to extend over the rear end of the bed of the truck 22 and over and beyond a horizontally disposed tailgate 50 thereof, as shown in FIGS. 2A, 3 and 6.

Figure 2A:
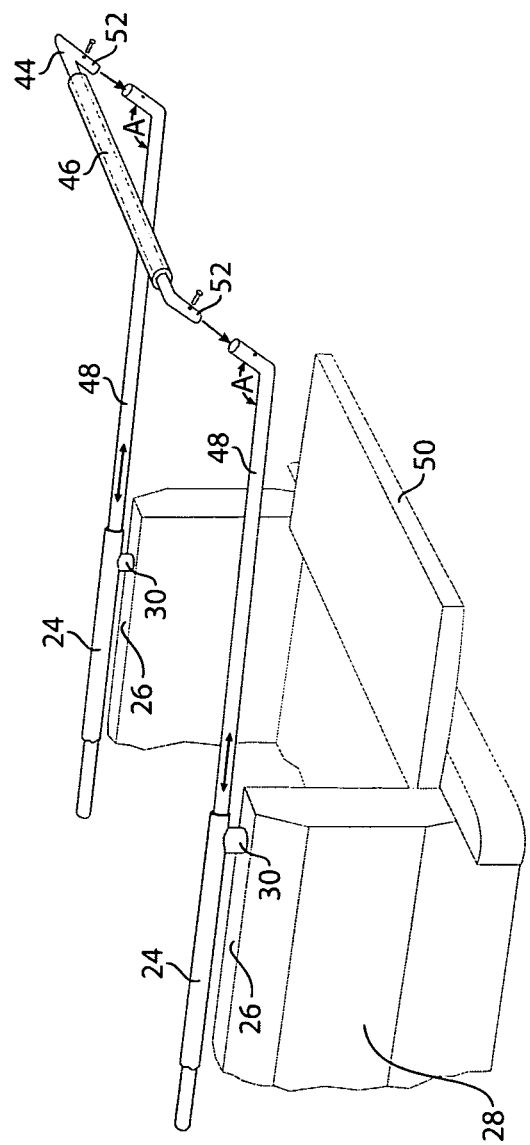
FIG. 2A is an exploded view of the rear support bar represented in FIG. 2.
Figure 10:
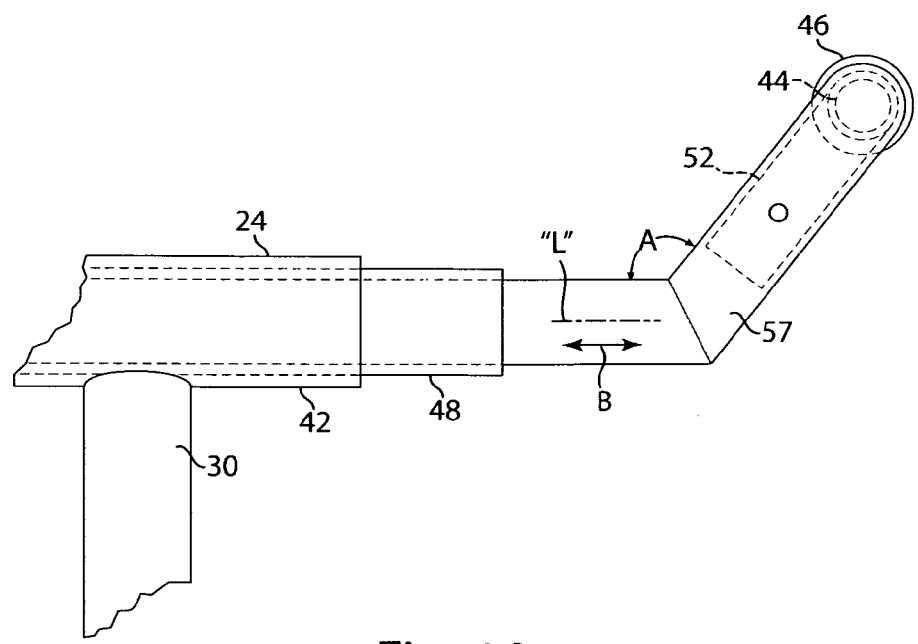
FIG. 10 is a side elevational view of the rear portion of the side rails and the side of the rear support bar.
Figure 11:
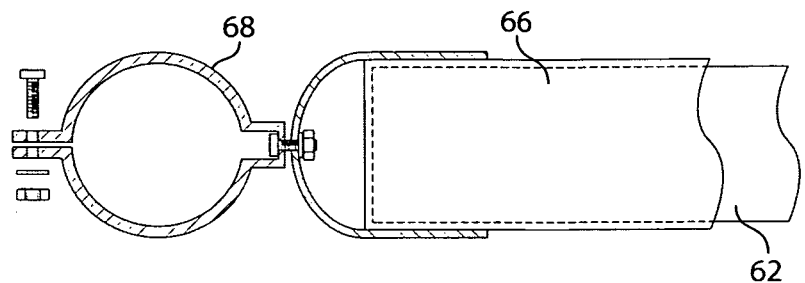
FIG. 11 is a detail view of the connection arrangement of the transverse bar to a side rail.

The rear distalmost end of the narrowest telescoping member 48 of the side rail assembly 24 is arranged at an obtuse angle "A" with respect to its longitudinal axis "L", as may be seen in FIGS. 2A and 10. FIG. 10 also shows a further of second telescoping member 56 whose angled rearmost end 57 is shown receiving the legs 52 of the support bar 44.

Figure 9:
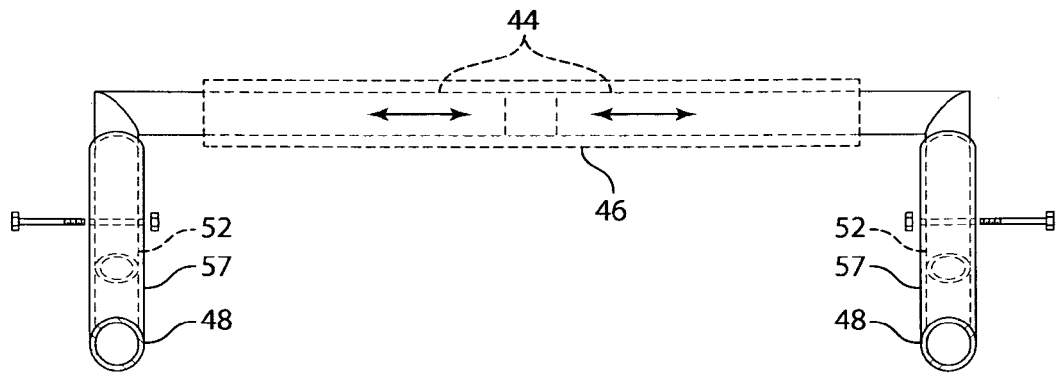
FIG. 9 is a side elevational view of the adjustable rear support bar.

The adjustable rear support bar 44 is of U-shaped configuration, as may be seen in FIGS. 9 and 9A, having leg portions 52 which made with an open tubular portion 54, within that obtusely angled distalmost rear portion 57 of the second tubular member 56 extending here, from the innermost side rail 48. The innermost side rail 48, in a further aspect of the present invention, may be of other cross-sectional shapes, such as for example, of "I" shape, or of rectilinear shape, or solid, with correspondingly shaped receiving members, (not shown for clarity of viewing), in which the rail 48 slidingly mates. FIG. 10 shows that second inner tubular member 56, telescopingly engaged to the distal end of the inner first tubular member 48, the telescoping relationship indicated by arrows "B" therein.

Figure 4:
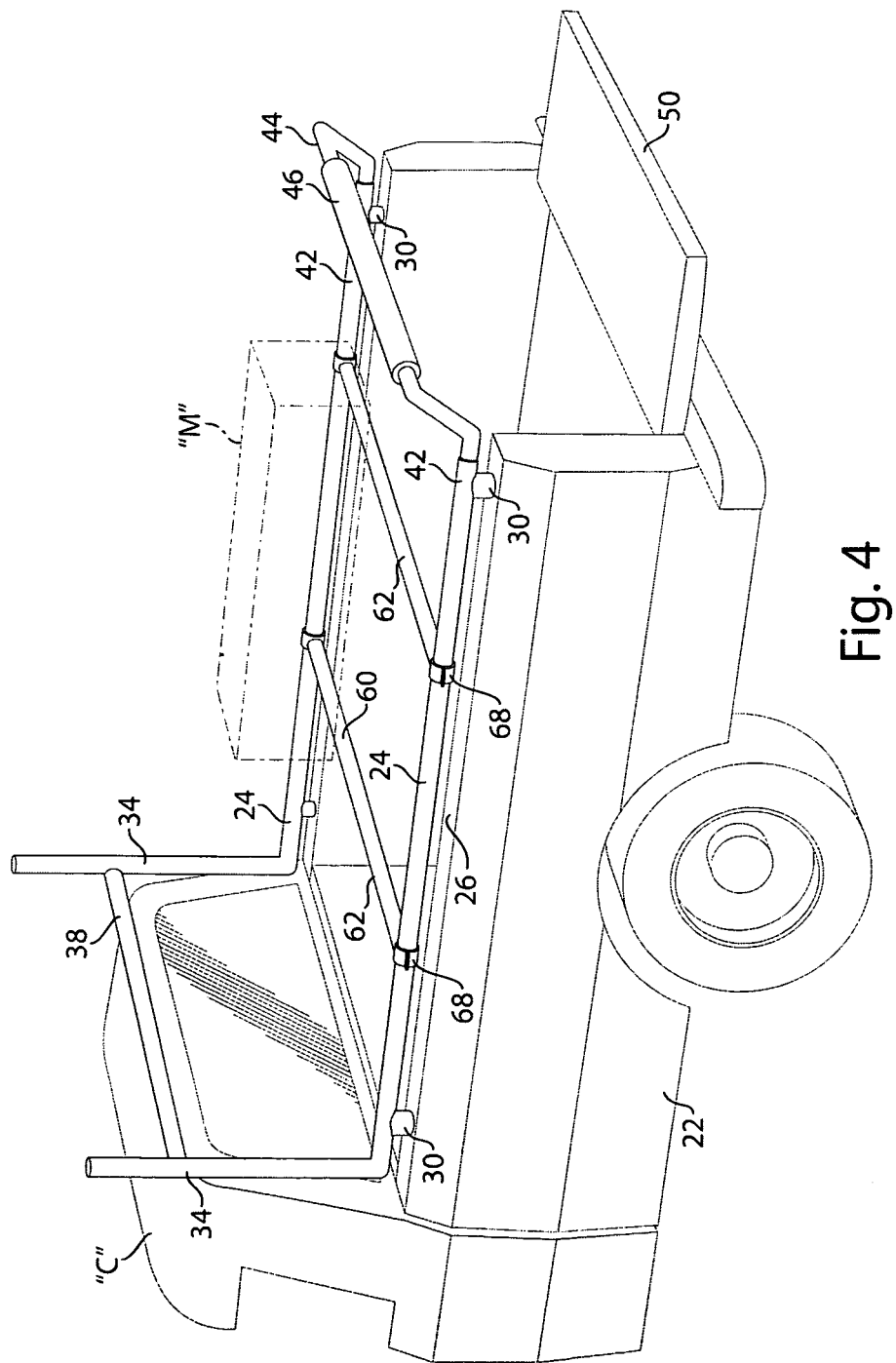
FIG. 4 is a rear perspective view of a pickup truck showing a second support arrangement of transverse adjustable bars arranged in combination with the side rail members.
Figure 5:
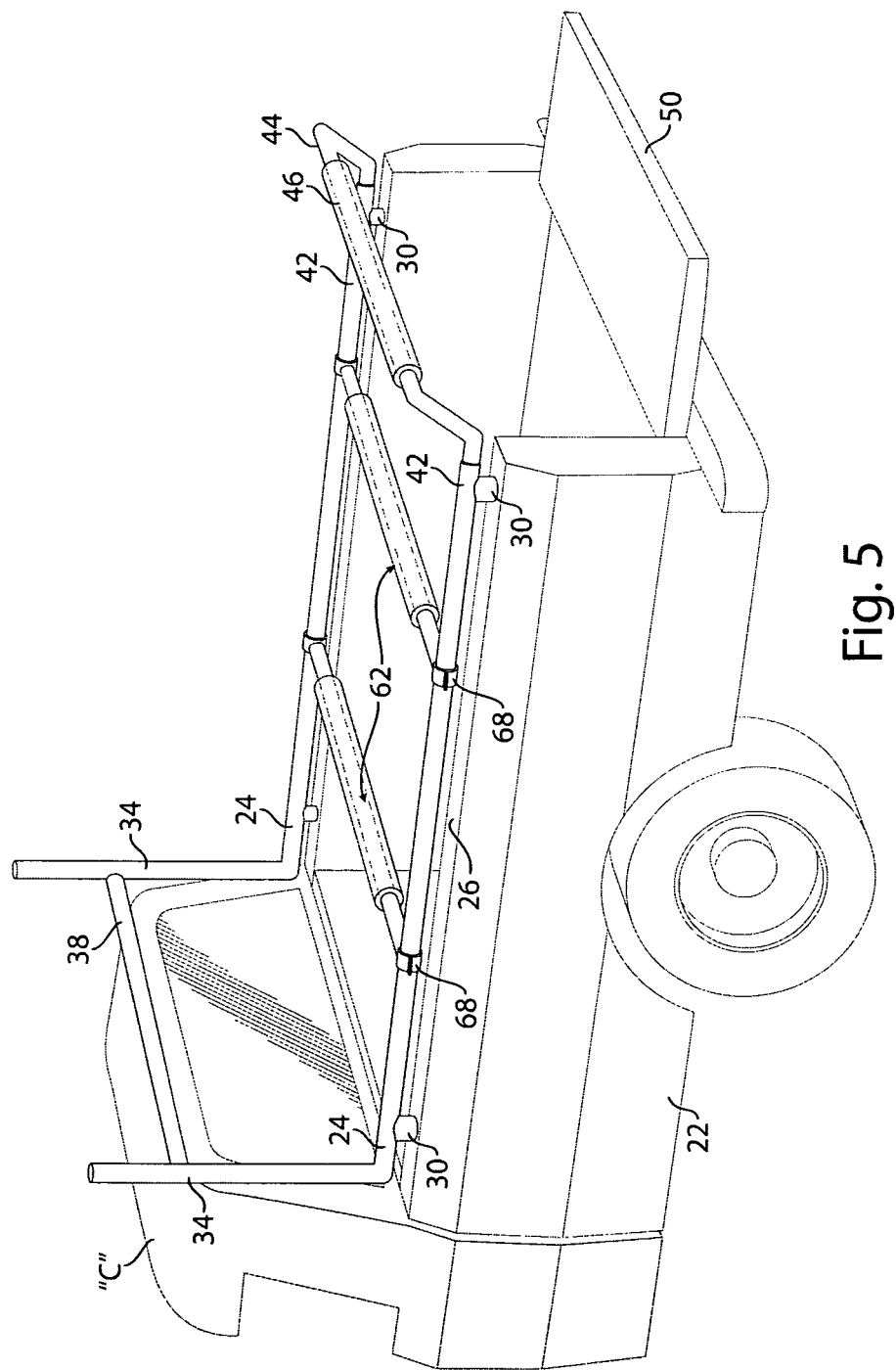
FIG. 5 is a view similar to FIG. 4, showing the intermating relationship of the transverse bar members.

A second load support assembly 60, is shown in FIG. 4, to enable a second level load "M" support array, shown in FIG. 4, is comprised of a plurality of transverse, telescopingly adjustable connecting members 62 attached to spaced-apart locations between the adjustable side rail assemblies 24, attached thereto by an attachment ring 68. The connecting members 62 are kept in longitudinal alignment by being enclosed by a tubular, closely rotatively supportive cargo bar 66, shown in FIGS. 4 and 5. Each of the spaced-part transverse connecting members 62 provides the basis for a separate load bearing support member base from that of the lower bed of the pickup truck 22.

Figure 7:
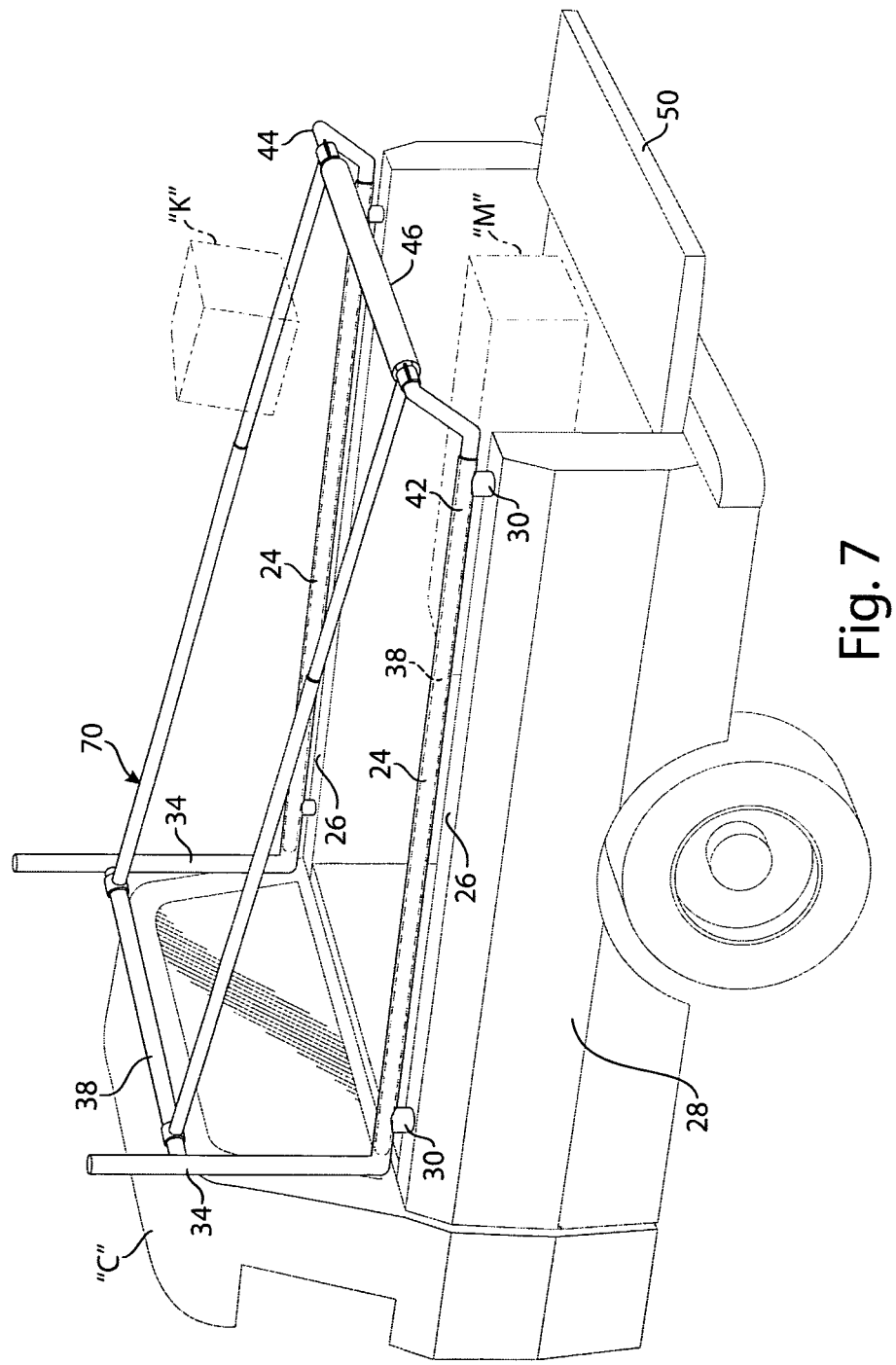
FIG. 7 is a rear perspective view of the side rail members along with a third side rail support assembly, angled with respect to the side rail assemblies and in supportive connection with the adjustable rear support bar.
Figure 8:
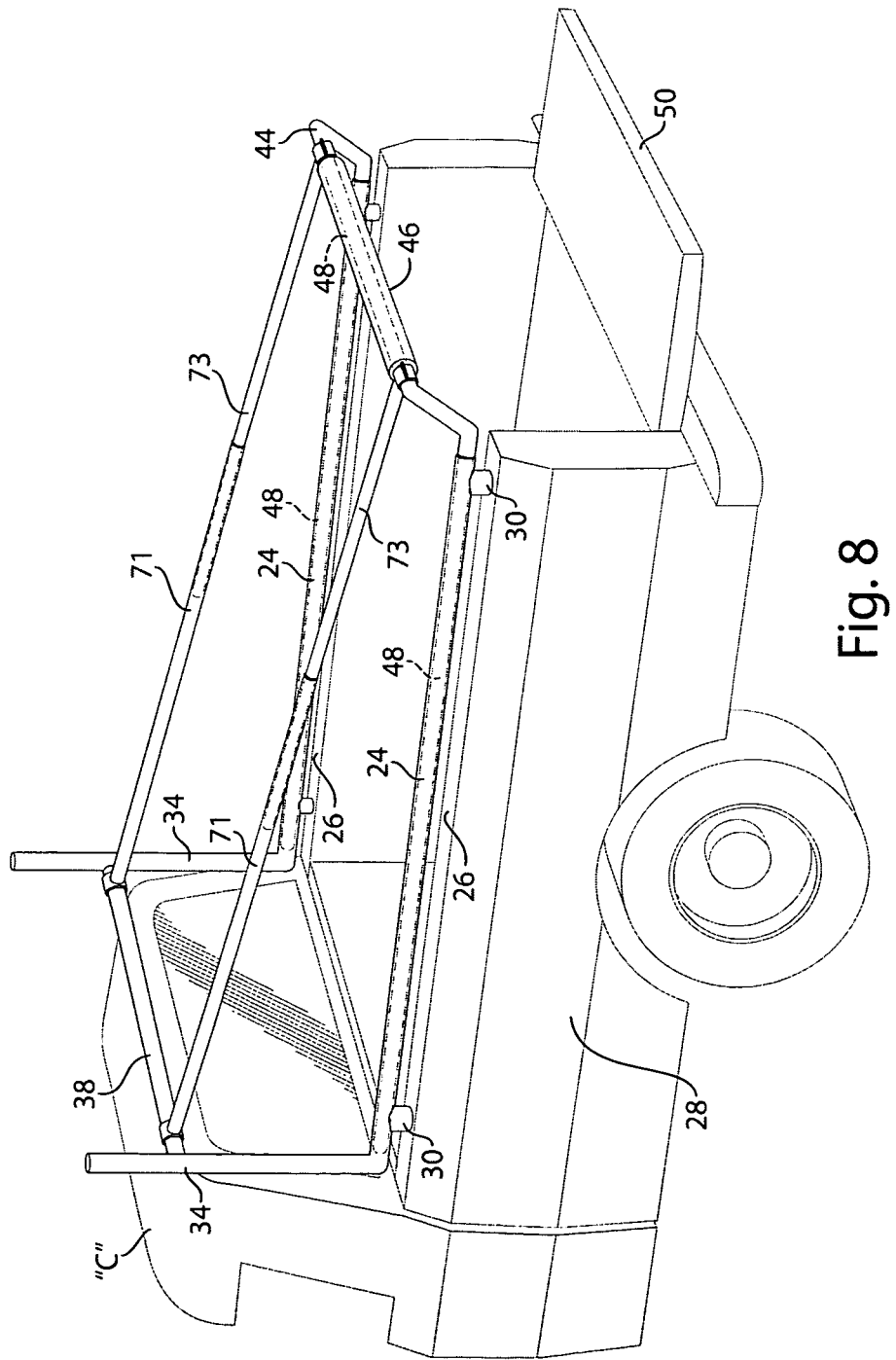
FIG. 8 is a view similar to FIG. 7, showing the intermating relationship of the third side rail support assembly and the side rails.

A third load support and rear bar support arrangement 70, shown in FIGS. 7 and 8 enable the third level support array 70 to carry a further load "K" to be maintained on the pickup truck, is comprised of a plurality of longitudinally extending telescope and the angled adjustable side rails 71 and 73, and angularly arranged (i.e., non horizontally and non parallel with respect to the side rails 24) between the upper transverse front rail 38 and the shoulder portions of the adjustable rear support bar 44, as represented in FIGS. 7 and 8, for supporting a load "K" at a slight angle (non horizontal) yet spaced apart from a lower load within the truck bed. That is, the third load support and rear bar support arrangement 70 permits yet a completely separate and distinct platform for separately supporting cargo loads "K" from other cargo loads, for example, load "M", and also or alternatively, for providing control and further reinforcement for the adjustable rear support bar 44 extending beyond the rear bed of the pickup truck 22.

Figure 14:
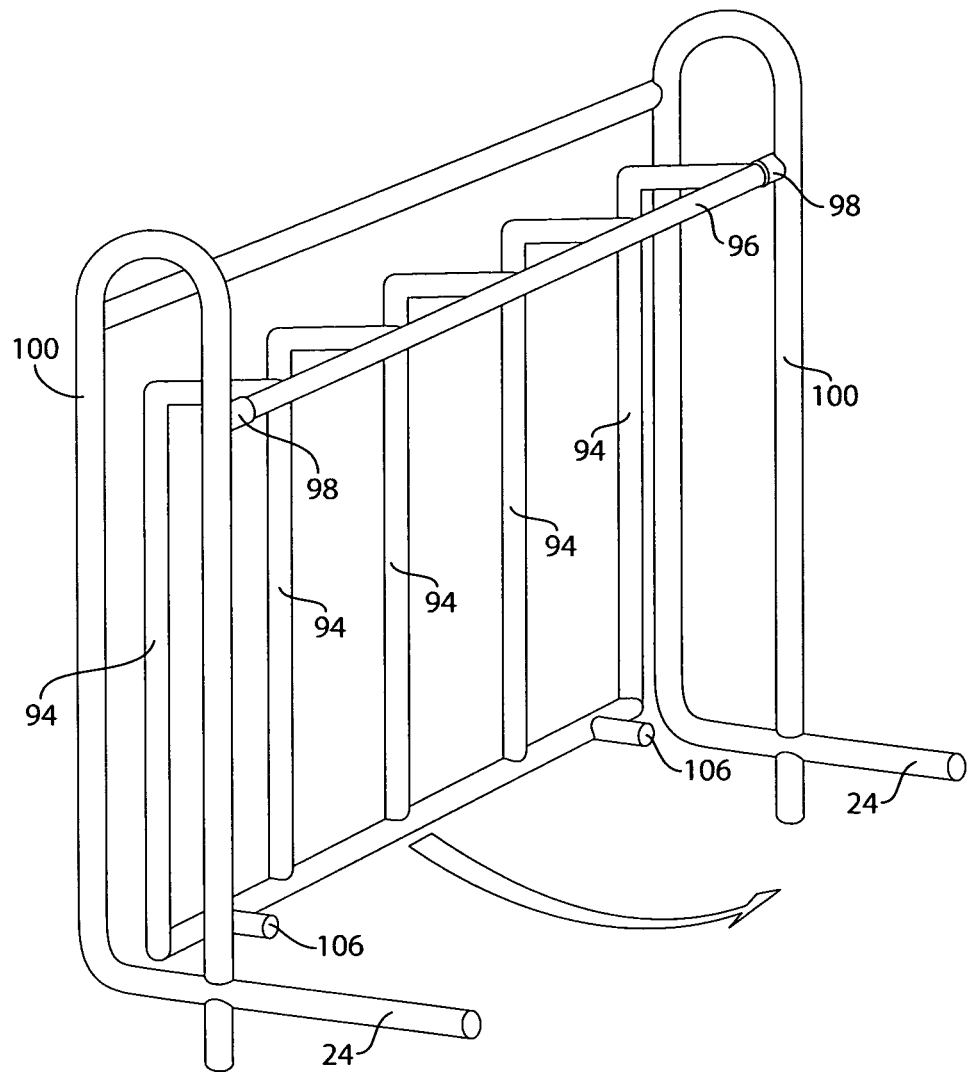
FIG. 14 is a perspective view of an articulable roof rack as part of the front assembly.
Figure 14B:
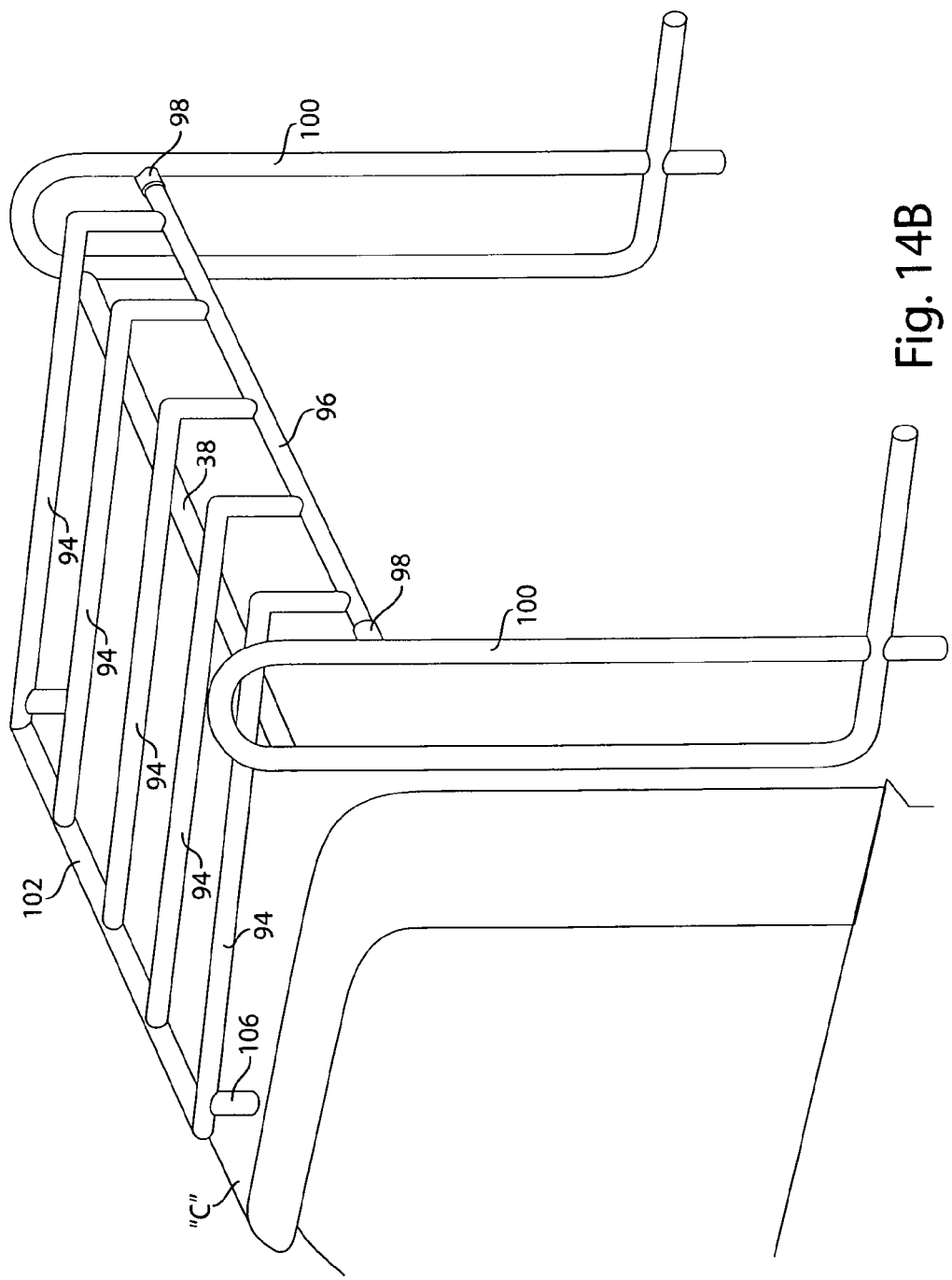
FIG. 14B shows the roof rack in its forwardmost configuration.
Figure 14C:
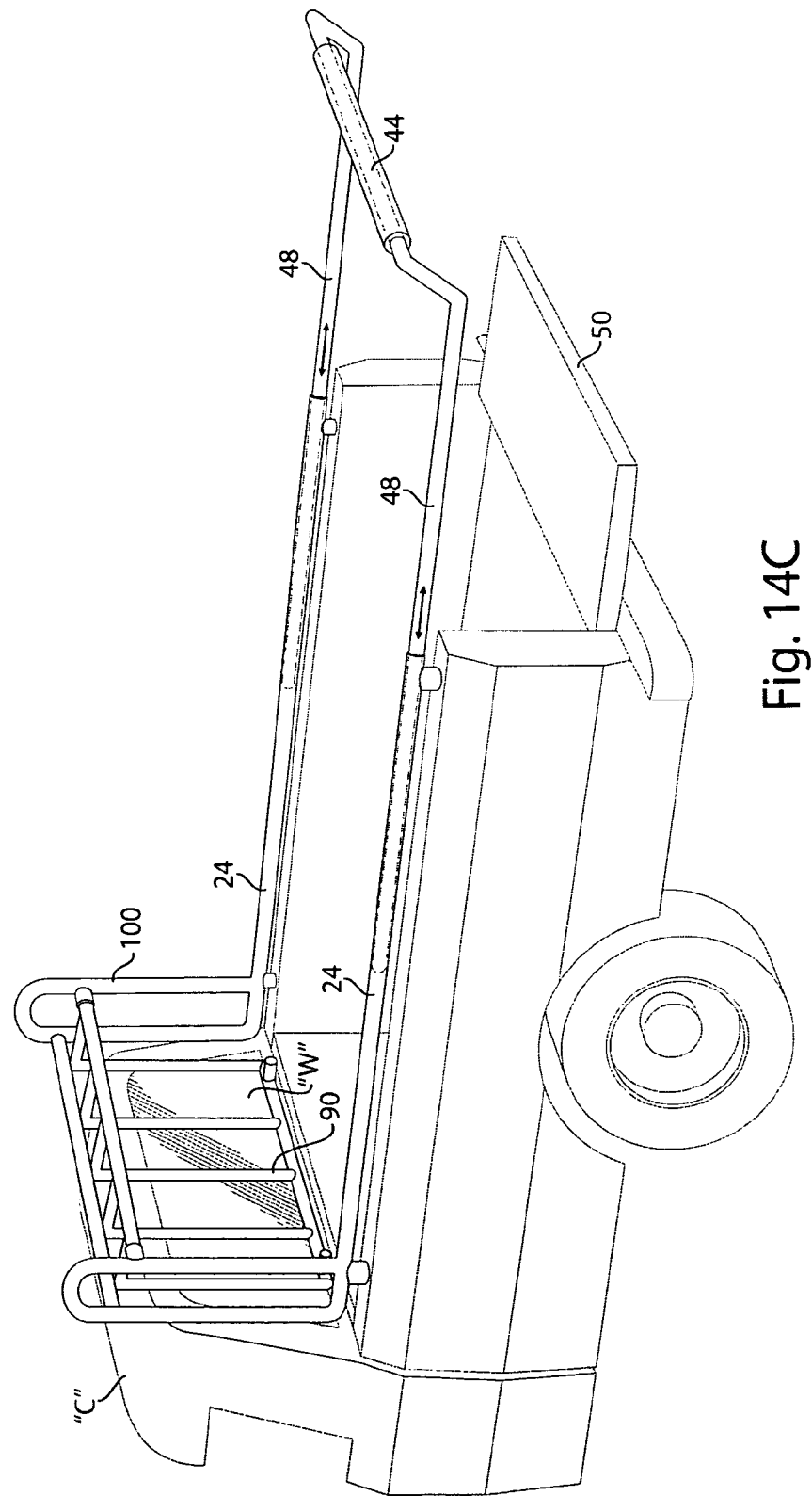
FIG. 14C shows a perspective view of the pickup truck with its side rails extended beyond the tail gate thereof, and the roof rack in its stored behind-the-cab configuration.

A yet further fourth load support platform 90 in a further embodiment of the present invention is shown in FIGS. 14, 14A, 14B and 14C, comprises an articulable roof rack 92 arranged on the front assembly of the pickup truck 22 adaptable load assembly 20. The roof rack 92 comprises a plurality of "L" shaped platform members 94 which are attached to a horizontally disposed pivot bar 96 for swingable movement about a pair of inwardly extending side axes 98 which extends from a pair of spaced part "U" shaped reinforcing frames 100 of that front assembly. The L-shaped platform members 94 are attached at their distalmost end to a transversely disposed "lower-to-front" platform bar 102. The platform members 94 are movable from a vertical, cab-window-protecting configuration immediately behind the cab window "W" of a pickup truck 22, shown best in FIG. 14C, and as shown in FIGS. 14, in a 270° rotation about its pivot axis 96 as shown in FIG. 14A, to a horizontal configuration cantilevered immediately above the cab "C" of the pickup truck 22, as shown in FIG. 14B, resting partially supportively on the front rail 38. The roof rack 92 may be also be stabilized by legs 106 extending onto the roof of the cab "C", as shown in FIG. 14B. The pivot bar rack 92 may be transversely adjustable to accommodate different sized pickup trucks in a manner similar to the transverse and longitudinal size accommodations of the other support members of this invention.

The invention claimed is:

1. A variable load support system for enhancing the load carrying capabilities of a bed of any one of a variety of variously sized pickup trucks, the support system comprising:
    a first pair of elongated, longitudinally-extendable pickup truck sidewall engageable side rails;
    a forwardly arranged first and a rearwardly arranged second, elongated, longitudinally-extendable pickup-truck-bed-traversing transverse rails, wherein the forward transverse rail has an articulable truck window protection grate pivotably attached thereto, which articulable truck window protection grate comprises a roof rack in a forwardly pivoted orientation., wherein the roof rack comprises a plurality of "L" shaped platform members which are connected between a pivot axis and cantilevered over a front rail on a front assembly thereof, wherein the roof rack of the front assembly rests upon an arrangement of feet when the roof rack is pivoted forwardly over a pickup truck cab; and
    a roller member housingly arranged about the rearwardly arranged pickup truck bed traversing transverse rail so as to permit the widthwise adaptability of the second transverse rail to a pickup truck side wall.

2. The variable load support system as recited in claim 1, wherein the first transverse rail comprises an internal, telescoping permitting expanding inner rail supportively enclosed by a pair of outer rails, to permit the forward portion of the support system to adapt to the width of the front of any of a wide variety of pickup truck beds.

3. The variable load support system as recited in claim 1, wherein the side rails have a plurality of spaced apart pickup truck side wall engaging stanchions, to provide structural support of the side rails to the sidewalls of a pickup truck.

4. The variable load support system as recited in claim 1, wherein the roof rack is of "L" shape in lontgitudinal cross-section.

5. The variable load support system as recited in claim 1, wherein the rearwardly arranged transverse rail is arranged at an obtuse angle with respect to the longitudinal extending axis of movement of the siderails.

6. The variable load support system as recited in claim 1, wherein the first pair of side rails have a plurality of transversely arranged longitudinally extensible connecting members supportively extending therebetween.

7. The variable load support system as recited in claim 1, including a second pair of elongated side rails, arranged at an acute angle with respect to the first pair of side rails.

8. The variable load support system as recited in claim 7, wherein the second pair of side rails comprises a second load supporting frame.

9. The variable load support system as recited in claim 7, wherein the second pair of side rails are attached between the forwardly arranged transverse rail and the rearwardly arranged transverse rail.

10. The variable load support system as recited in claim 9, wherein the first pair of side rails and the second pair of side rails are correspondingly longitudinally extendable.

11. A method of enhancing the cargo carrying capacity of any one of a wide variety of different sized pickup trucks comprising:
    arranging a side rail assembly consisting of first pair of elongated, telescopingly adjustable, side wall engageable side rails and a front assembly, onto side walls of a pickup truck, wherein the front assembly comprises a forwardly arranged elongated, telescopingly adjustable transversely extending transverse rail between a forward end of the first pair of side rails;

arranging a rearwardly, second, elongated, longitudinally-extendable pickup-truck-bed-traversing transverse rail, wherein the forward transverse rail has an articulable truck window protection grate pivotably attached thereto, which articulable truck window protection grate comprises a roof rack in a forwardly pivoted orientation, wherein the roof rack comprises a plurality of "L" shaped platform members which are connected between a pivot axis and cantilevered over a front rail on a front assembly thereof, wherein the roof rack of the front assembly rests upon an arrangement of feet when the roof rack is pivoted forwardly over a pickup truck cab; and enclosing a roller member housingly about the rearwardly arranged pickup truck bed traversing transverse rail so as to permit the widthwise adaptability of the second transverse rail to a pickup truck side wall.

* * * * *